United States Patent

Suzuki et al.

[11] Patent Number: 6,133,660
[45] Date of Patent: *Oct. 17, 2000

[54] BEARING STRUCTURE FOR BRUSHLESS DC MOTOR

[75] Inventors: Yuzuru Suzuki; Taketoshi Ohyashiki; Naoyuki Harada, all of Shizuoka-ken, Japan

[73] Assignee: Minebea Co., Ltd., Nagano, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/099,777

[22] Filed: Jun. 19, 1998

[30] Foreign Application Priority Data

Jun. 20, 1997 [JP] Japan .................................. 9-163673

[51] Int. Cl.[7] ...................................................... H02K 5/16
[52] U.S. Cl. ........................... 310/90; 310/254; 310/156; 384/100; 384/291
[58] Field of Search ........................... 310/90, 156, 254, 310/177; 384/100, 909, 113, 291

[56] References Cited

U.S. PATENT DOCUMENTS

| | | |
|---|---|---|
| 3,845,339 | 10/1974 | Merkle et al. .......................... 310/156 |
| 4,371,220 | 2/1983 | Brucher ................................... 384/371 |
| 5,236,784 | 8/1993 | Kobayashi et al. ..................... 428/408 |
| 5,322,369 | 6/1994 | Kataoka et al. ............................ 384/1 |
| 5,366,298 | 11/1994 | Toshimitsu et al. .................... 384/107 |
| 5,623,382 | 4/1997 | Moritan et al. ...................... 360/99.08 |
| 5,678,929 | 10/1997 | Parsoneault et al. .................... 384/112 |
| 5,685,647 | 11/1997 | Leuthold et al. ....................... 384/113 |
| 5,806,169 | 9/1998 | Trago et al. .............................. 29/596 |
| 5,847,479 | 12/1998 | Wang et al. .............................. 310/90 |

*Primary Examiner*—Nestor Ramirez
*Assistant Examiner*—Joseph Waks
*Attorney, Agent, or Firm*—Staas & Halsey LLP

[57] ABSTRACT

A brushless DC motor including a rotor, a field magnet, and fixed poles having salient poles opposed to the field magnet. A bearing structure includes a rotating portion adapted to rotate with the rotor, a part of which rotating portion contacts the shaft, and a groove formed in the rotating contact portion at a predetermined angle between an angle parallel to the axial direction of the rotating portion and an angle perpendicular thereto. A lubricating oil fills both the rotating contact portion and the groove. A plastic plate is disposed under the rotating portion to bear a thrust force of the rotating portion.

21 Claims, 6 Drawing Sheets

BEARING STRUCTURE FOR BRUSHLESS DC MOTOR

BACKGROUND OF THE INVENTION

1. Field of the Invention

The present invention relates to upgrading a spindle motor for an optical disk and more particularly to making a motor bearing high in service life and low in all of load, vibration and noise.

2. Description of the Prior Art

In reply to the recent demand for higher performance of various office automation devices, the operating speeds of those devices are becoming higher and higher. At the same time, spindle motors for driving disks in various devices are also required to rotate at higher speeds to meet the demand for speed-up. Once spindle motors become high in their rotational speeds, it is inevitably required for their bearing mechanisms that the loss of torque be low. As a result, ball bearings are used to meet this demand. However, this tendency leads to an increase of cost. In view of this point and in order to reduce the cost of bearings, there actually are employed plain bearings formed of a sintered alloy impregnated with a lubricating oil.

If ball bearings are used in a conventional high-speed rotation type spindle motor, it is possible to decrease the loss of torque and attain a high rotational accuracy, but there is the tendency that the higher the rotation, the more conspicuous the resulting vibration and noise. In the case of plain bearings, they are superior in point of reducing vibration and noise in comparison with ball bearings, but involve the problem that the loss of torque increases and that the rotational accuracy becomes unstable due to a clearance between the sintered alloy of the bearings and a rotary shaft of the motor.

The present invention has been accomplished in view of the above-mentioned problems and it is an object of the invention to provide a bearing structure in a brushless DC motor which bearing structure can diminish the loss of torque caused by rotational contact and can suppress vibration and noise.

SUMMARY OF THE INVENTION

According to the present invention, in order to achieve the above-mentioned object, in a brushless DC motor comprising a rotor, which rotor is held rotatably and has a field magnet, and fixed poles having salient poles opposed to the field magnet of the rotor, there is provided a bearing structure including a rotating portion adapted to rotate with rotation of the rotor, a fixed portion which supports the rotating portion while making a rotating contact with the rotating portion, a groove formed in a portion of such rotating contact at a predetermined angle in the range of between an angle parallel to the axial direction of the rotating portion and an angle perpendicular thereto, a lubricating oil which fills both the rotating contact portion and the groove, and a resin plate disposed under the rotating portion to bear a thrust force of the rotating portion. In combination with this bearing structure there also is provided a bearing structure further including first pole pieces disposed respectively on the upper sides of the salient poles of the fixed poles which are located on one side, centered on the axis of the rotating portion, the first pole pieces being formed of a soft magnetic material and functioning to collect magnetic flux passing the salient poles, and second pole pieces disposed respectively on the lower sides of the auxiliary poles of the fixed poles which are located on the opposite side, centered on the axis of the rotating portion, the second pole pieces being formed of a soft magnetic material and functioning to collect magnetic flux passing the salient poles.

In the present invention, a spiral groove is formed in the inner peripheral surface of a plain bearing by cutting for the purpose of decreasing the loss of torque of the plain bearing. As a result, it became possible to improve lubrication between the bearing (fixed portion), which is formed in a cylindrical shape using a sintered alloy, and a rotary shaft (rotating portion). The effect of the spiral groove differs depending on the angle thereof. For example, when the angle of the groove relative to the axial direction of the rotary shaft is small, the loss of torque is large although vibration and noise are suppressed, while when the said angle is large, vibration and noise are conspicuous although the loss of torque is small. Further, a ratio between the groove and the contact area of rotary shaft exerts a great influence on the reliability life although it does not affect the initial characteristics. Particularly, it has been confirmed experimentally that a too large area ratio of the groove causes a marked deterioration of the reliability life. In the present invention, therefore, the angle between the spiral groove and the axial direction of the rotary shaft is set at a value in the range from 60° to 87° whereby a bearing of low torque loss, low vibration and low noise can be realized. Moreover, by setting the ratio between the groove and the contact area of rotary shaft at a value in the range from 1:5 to 1:3, it is possible to realize a bearing of a high service life. The bearing structure of the present invention is not specially restricted by the type of a motor, but is applicable as it is to an outer rotor type brushless DC motor. It is optional whether the above groove is to be formed in the rotating portion or in the fixed portion which are in rotating contact with each other.

DESCRIPTION OF THE PREFERRED EMBODIMENTS

Figure 1:
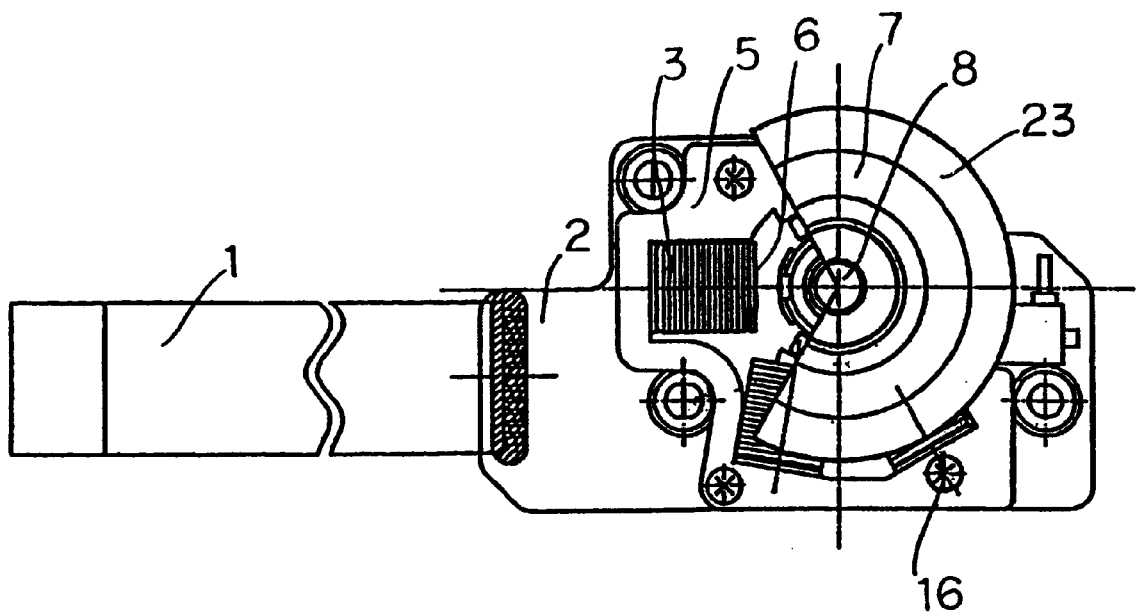
FIG. 1 is a plan view of an inner rotor type brushless DC motor according to the present invention.
Figure 2:
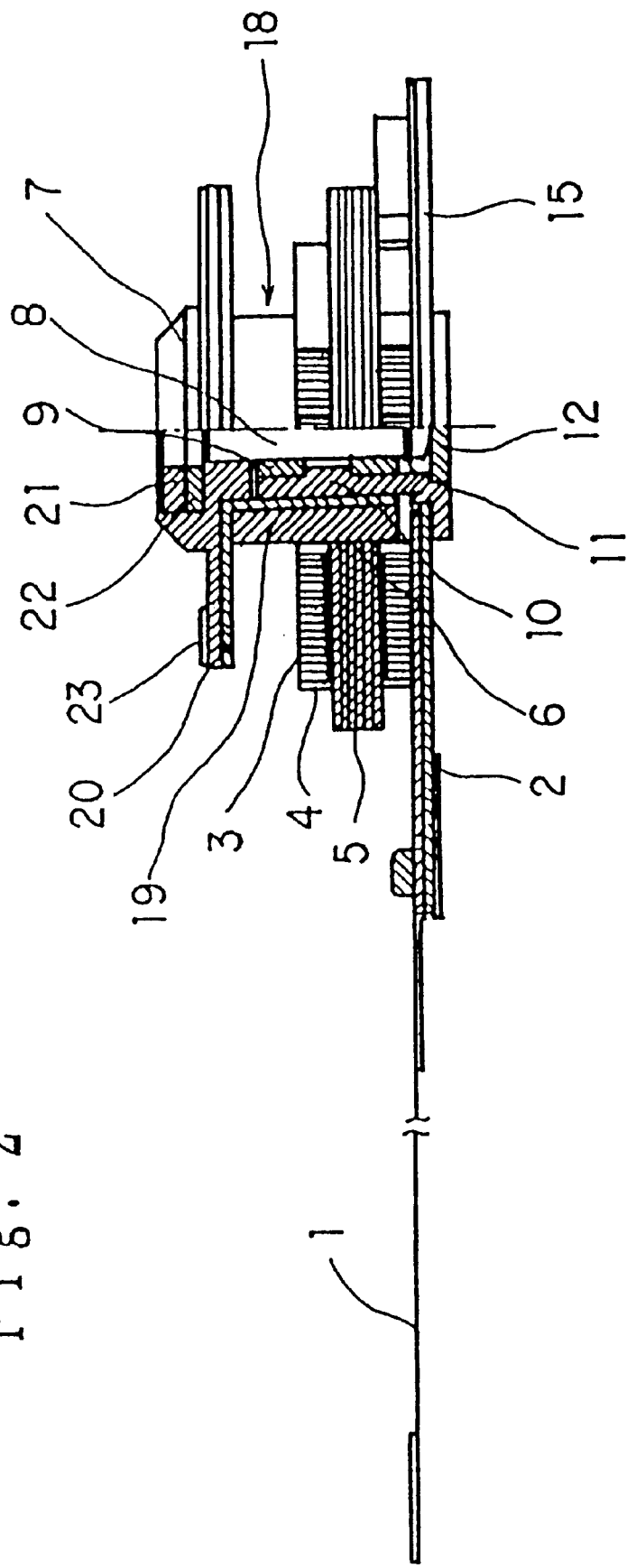
FIG. 2 is a sectional view thereof.
Figure 3:
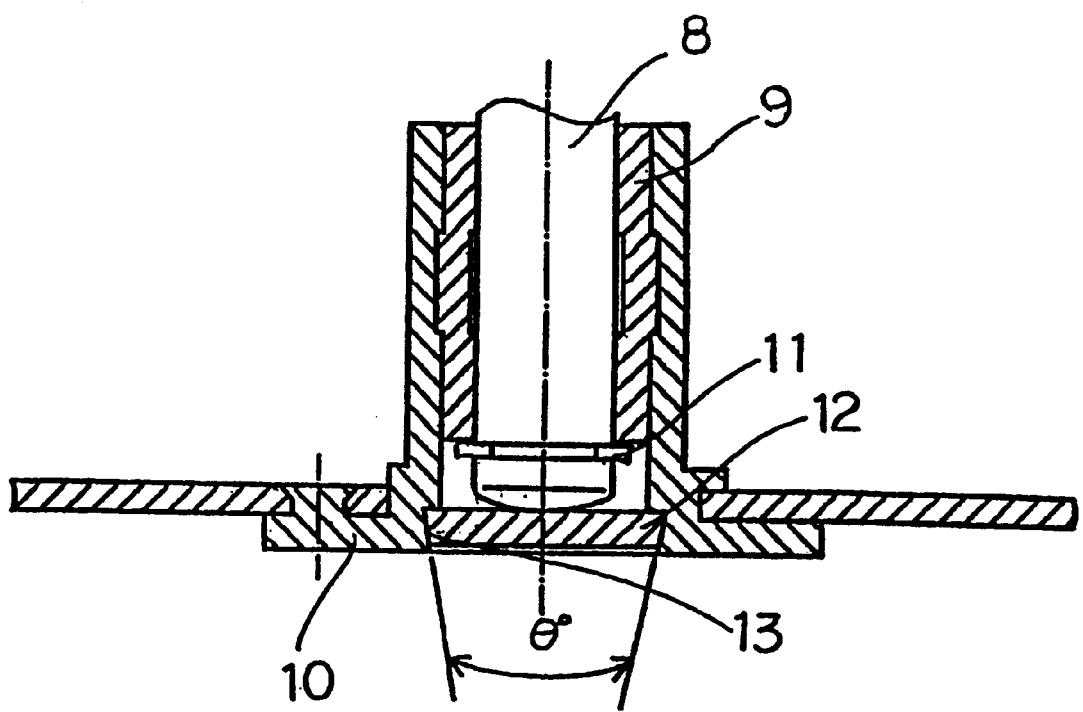
FIG. 3 is an enlarged view of a bearing portion.
Figure 4:
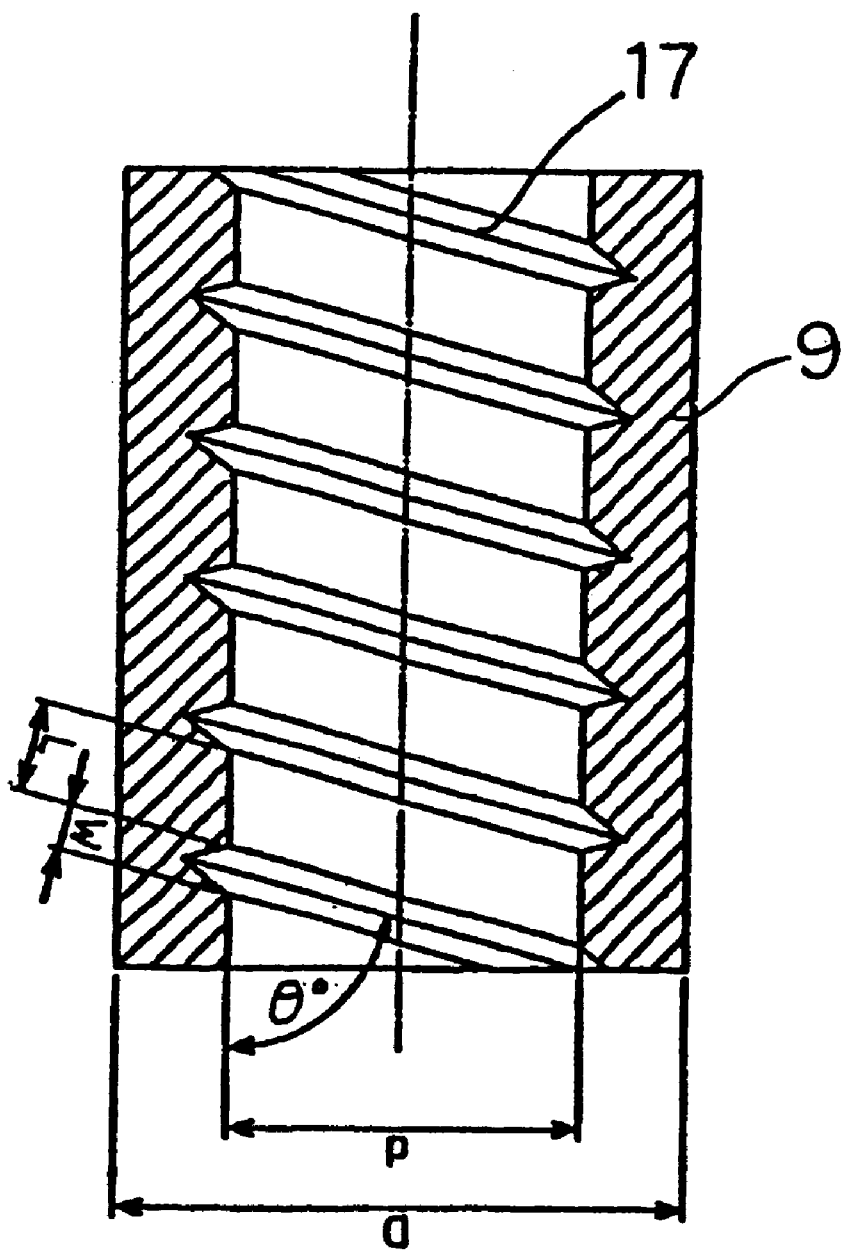
FIG. 4 is an enlarged view of an inner peripheral surface of the bearing portion which is formed in a cylindrical shape using a sintered alloy.
Figure 5B:
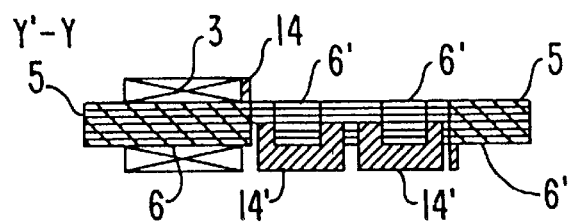
FIGS. 5A–D are detail views comprising a front view and sectional views of a stator yoke, showing a relation to pole pieces.
Figure 5A:
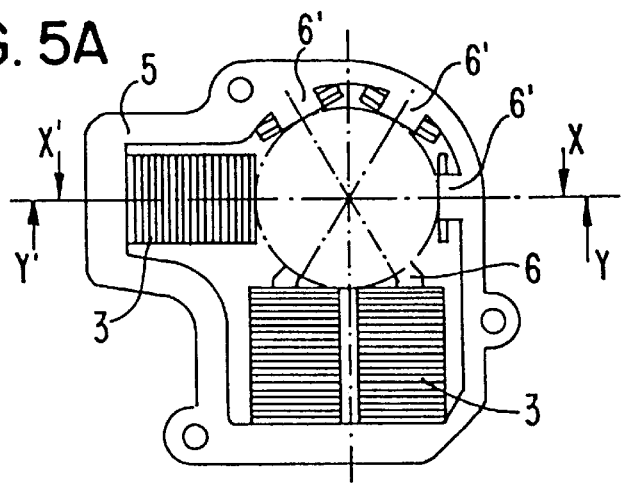
Figure 5D:
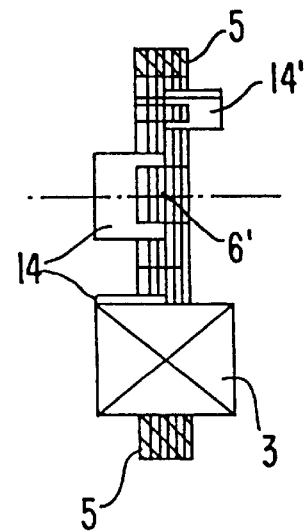
Figure 5C:
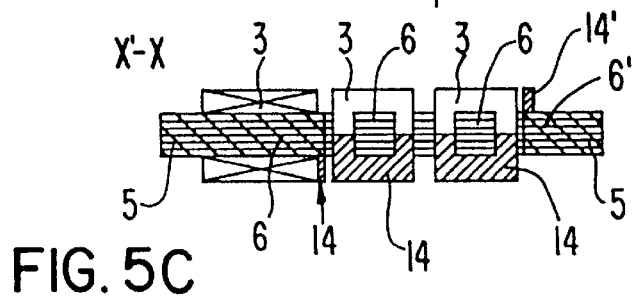

An embodiment of the present invention will now be described in detail with reference to the accompanying drawings, in which FIG. 1 is a plan view of an inner rotor type brushless DC motor for CD-ROM related to the present invention, FIG. 2 is a sectional view thereof, FIG. 3 is an enlarged view of a bearing, FIG. 4 is an enlarged view of an inner peripheral surface of the bearing which is formed in a cylindrical shape using a sintered alloy, and FIG. 5 is a detail view comprising a front view and sectional views of a stator yoke, showing a relation to pole pieces. In these figures, the reference numeral 1 denotes a lead wire as an interface of the motor, numeral 2 denotes a printed circuit board with various components and circuits printed thereon for controlling the motor, numeral 3 denotes a driving coil comprising a bobbin 4 and a magnet wire wound round the bobbin, numeral 5 denotes a stator yoke constituted by a laminate of soft magnetic steel plates and having salient poles formed on the inner periphery thereof, numeral 7 denotes a turntable for carrying an optical disk thereon, numeral 8 denotes a shaft as a rotational center of the turntable 7, numeral 9 denotes a bearing formed in a cylindrical shape using a sintered alloy, the bearings 9 being mounted in upper and lower positions of the shaft 8, numeral 10 denotes a housing which holds the bearings 9, numeral 11 denotes a washer for preventing dislodgment of the turntable 7, and numeral 12 denotes a resin plate for holding the turntable axially.

Now, with reference to FIG. 3, a description will be given of a method for fixing the resin plate 12 into a tapered opening 13. The resin plate 12 is inserted into the tapered insertion opening 13, thereby eliminating the need of going through the step of bonding or caulking to fix the resin plate 12. When the said taper is formed at an angle θ of $60° \leq \theta \leq 80°$, it is made possible to ensure a high working efficiency in the insertion of the resin plate 12 and a high fixing strength. The construction of the stator yoke 5 will now be described. A stator yoke 5 with, relative to the rotor, three salient poles 6, wound with driving coils 3, arranged circumferentially in series, and next, three auxiliary poles 6' arranged in series. As for the three auxiliary poles 6' of the stator yoke 5, driving coils are not wound thereon, which poles 6' serve as auxiliary poles for the decrease of cogging torque.

In the stator yoke 5 with the driving coils 3 mounted thereon, the inner peripheral surfaces of salient poles 6 are made coaxial with the cylindrical bearings 9 formed of a sintered alloy and in this state the stator yoke is fixed to a base 15 with mounting bolts 16. In the base 15, the bearings 9 which support the rotary shaft 8 of the motor rotatably are formed by insert molding integrally with the housing 10 and are fixed vertically.

FIG. 4 shows a part of the inner surface of each cylindrical bearing 9 formed of a sintered alloy, and numeral 17 denotes a spiral groove formed in the inner peripheral surface of the bearing. The groove 17 is formed one or in a plural number at an angle θ of $60° \leq \theta \leq 87°$ and at a W:L ratio in the range from 1:3 to 1:5.

Description is now directed to a rotor 18. The turntable 7 is formed using a polymeric material, and the shaft 8 serving as a rotational center of the rotor 18 is formed centrally of the rotor by insert molding. To the underside of the turntable 7 is fixed a back yoke 20 of a field magnet 19 by heat-caulking, which back yoke also serves to reinforce the turntable. The back yoke 20 and the turntable 7 may be fixed to each other by insert molding together with the shaft 8, or may be fixed together by ultrasonic caulking. The field magnet 19 is constituted by a rare earth magnet. After magnetization to a predetermined number of poles, the field magnet 19 is fixed to the back yoke 20. On the other hand, a magnet 21 for attracting a damper (not shown) to chuck an optical disk is fixed by bonding to the central portion of the opposite side of the turntable 7, with a back yoke 22 positioned on the underside. The attracting magnet 21 and the back yoke 22 may be fixed by integral molding together with the turntable 7. Further, a non-slip rubber 23 for optical disk is affixed to the outer periphery side of the turntable 7.

Now, with reference to FIG. 5, a detailed structure of fixed. The stator yoke 5 with the three salient poles 6 wound with driving coils 3, arranged circumferentially in series, and next, the three auxiliary poles 6' arranged in series so that pole piece 14 (shaped like a square with a side removed), can be inserted in the upper side of salient pole 6, and pole piece 14' can be inserted in the lower side of auxiliary pole 6', thus allowing pole pieces 14, 14' to collect the magnetic flux passing through the salient poles 6, which has the effect of both improving the motor torque characteristic and reducing noise and vibration.

The upper part of the field magnet 19 of the rotating rotor is attracted more strongly in the direction of pole piece 14, inserted into the upper side of salient pole 6, wound with driving coil 3, and the lower part of the field magnet 19 is more strongly attracted in the direction of pole piece 14' of auxiliary pole 6', so the rotor rotates with a constant inclination.

Accordingly, the upper side of rotary shaft 8 inclines in the axial direction, while the lower side inclines in the radial direction, and the rotary shaft 8 rotates in contact with the sintered alloy bearing 9 which is fixed to the housing 10. Therefore, vibration and noise arising from the gap between the rotary shaft 8 and the bearing 9 are suppressed, resulting in highly precise rotation. The gap is preferably in the range of 3 μm to 7 μm.

Figure 6:
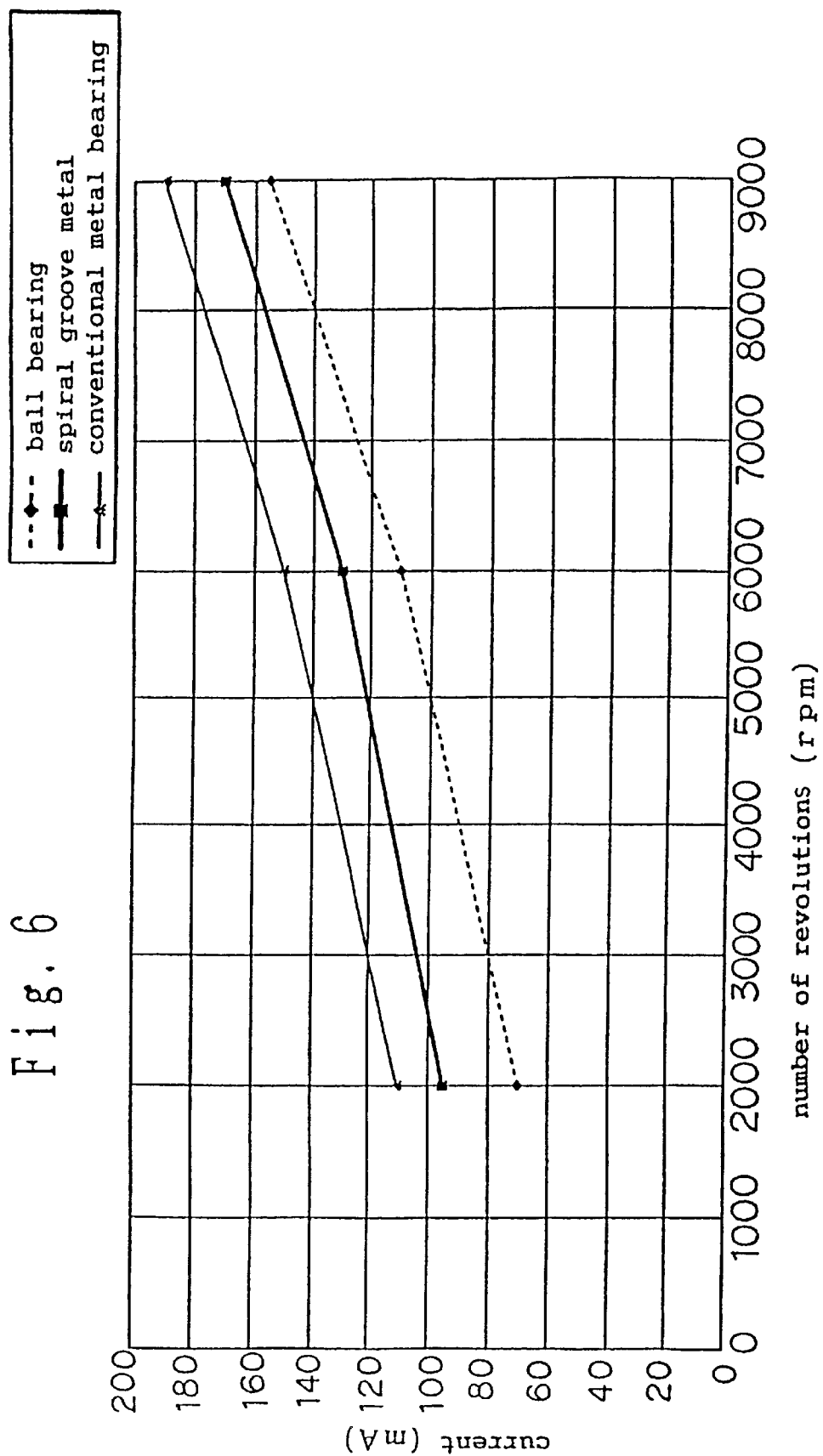
FIG. 6 is a graph showing a difference in no-load current between a bearing with a groove according to the present invention and a conventional bearing.

FIG. 6 is a graph showing a difference in no-load current between the bearing with groove according to the present invention and a conventional bearing, from which graph it is seen how effective the bearing of the present invention is.

Although the present invention has been described above by way of an embodiment thereof, various modifications and applications may be made within the scope of the invention. For example, the bearing structure of the invention is applicable as it is to an outer rotor type brushless DC motor. Such modifications and applications are not excluded from the scope of the invention.

According to the present invention, as set forth hereinabove, in a brushless DC motor comprising a rotor, which rotor is held rotatably and has a field magnet, and fixed poles having salient poles opposed to the field magnet of the rotor, there is provided a bearing structure including a rotating portion adapted to rotate with rotation of the rotor, a fixed portion which supports the rotating portion while making a rotating contact with the rotating portion, a groove formed in a portion of such rotating contact at a predetermined angle in the range of between an angle parallel to the axial direction of the rotating portion and an angle perpendicular thereto, a lubricating oil which fills both the rotating contact portion and the groove, and a resin plate disposed under the rotating portion to bear a thrust force of the rotating portion. In combination with this bearing structure there also is provided a bearing structure further including first pole pieces disposed respectively on the upper sides of the salient poles of the fixed poles which are located on one side, centered on the axis of the rotating portion, the first pole pieces being formed of a soft magnetic material and functioning to collect magnetic flux passing the salient poles, and second pole pieces disposed respectively on the lower sides of the auxiliary poles of the fixed poles which are located on the opposite side, centered on the axis of the rotating portion, the second pole pieces being formed of a soft magnetic material and functioning to collect magnetic flux passing the salient poles. With these constructions, it is possible to diminish the loss of torque caused by the rotating contact, and at the same time iron loss can be suppressed because of a small number of poles, whereby it is possible to obtain a high-speed rotation type motor with low power consumption. Additionally, the provision of both first and second pole pieces can afford a motor of low vibration and low noise and having a stable rotary shaft. Thus, a motor suitable for high-speed rotation can be fabricated at low cost.

What we claim is:

1. A brushless DC motor having a rotor with a field magnet and a rotatively supported shaft, and a stator with stator magnetic poles having salient poles in opposition to the rotor field magnet, comprising:

a rotating portion which rotates with said rotor;

a bearing, connected to a housing, said bearing including a surface which contacts the shaft to rotatively support the rotor;

a spiral groove formed on the bearing extending continuously in an axial direction of the bearing with a constant angle of inclination;

lubricating oil filling said groove;

a plastic plate on an end of said rotating shaft to receive a force in a thrust direction of said rotating shaft; and a tapered insertion opening provided on said housing, a contacting section of said plate being formed as an inverse trapezoid to be received by said insertion opening.

2. The motor according to claim 1, wherein an angle between the spiral groove and the axial direction of the shaft is in a range from 60° to 87°.

3. The motor according to claim 1, wherein a contact area ratio between the groove and the shaft is in a range from 1:5 to 1:3.

4. The motor according claim 1, wherein a clearance gap between the bearing and the shaft is in a range of 3 $\mu$m to 7 $\mu$m.

5. The motor according to claim 1, wherein said housing is molded with a synthetic resin to a base to which the stator is connected.

6. A brushless DC motor having a rotor with a field magnet and a rotatively supported shaft, and a stator with stator magnetic poles having salient poles in opposition to the rotor field magnet, comprising:

a rotating portion which rotates with said rotor;

a bearing, connected to a housing, said bearing including a surface which contacts the shaft to rotatively support the rotor;

said stator poles being located on a stator yoke in opposition to said rotor magnet, said stator poles including a plurality of salient poles having drive coils in a circumferential direction, and a plurality of auxiliary poles;

a spiral groove formed on the bearing extending continuously in an axial direction of the bearing with a constant angle of inclination;

lubricating oil filling said groove;

first pole pieces formed from soft magnetic material, having a shape, viewed from a side thereof, like a square with a side removed, and inserted on one side of the salient poles;

second pole pieces formed from soft magnetic material, having a shape, viewed from a side thereof, like a square with a side removed, and inserted on an opposite side of said plurality of auxiliary poles;

said first and second pole pieces collecting magnetic flux; and a plastic plate on an end of said rotating shaft to receive a force in the thrust direction of said rotating shaft.

7. The motor according to claim 6, wherein an angle between the spiral groove and the axial direction of the shaft is in a range from 60° to 87°.

8. The motor according to claim 6, wherein a contact area ratio between the groove and the shaft is in a range from 1:5 to 1:3.

9. The motor according claim 6, wherein a clearance gap between the bearing and the shaft is in a range of 3 $\mu$m to 7 $\mu$m.

10. The motor according to claim 6, wherein said housing is molded with a synthetic resin to a base to which the stator is connected.

11. A brushless DC motor having a rotor with a field magnet and a rotatively supported shaft, and a stator yoke having a plurality of salient poles in opposition to the rotor field magnet, comprising:

a rotating portion which rotates with said rotor;

a cylindrical bearing fixed to a housing and having an inner surface which contacts the shaft supporting the rotor;

said plurality of salient poles being connected to said yoke and being opposite to said rotor field magnet;

stator poles with the plurality of the salient poles wound with a drive coil, arranged circumferentially in series, and a plurality of auxiliary poles arranged in series;

a spiral groove formed on the bearing to extend continuously in an axial direction of the bearing with a constant angle of inclination;

lubricating oil filling said groove;

u-shaped first pole pieces formed from soft magnetic material and inserted on one part of a tip of said salient pole wound with the drive coil;

u-shaped second pole pieces formed from soft magnetic material and inserted on an opposite part of the tip of said salient pole of the auxiliary pole; and a plastic plate located on an end of said rotating shaft to receive a force in the thrust direction of said rotating shaft, wherein magnetic flux from the rotor is corrected by said first and second pole pieces, and both the upper part and the lower part of the rotary shaft inclines in the radial direction, with the inclination of opposite direction, by the attractive force between said pole pieces and rotor.

12. The motor according to claim 11, wherein an angle between the spiral groove and the axial direction of the shaft is in a range from 60° to 87°.

13. The motor according claim 11, wherein a contact area ratio between the groove and the shaft is in a range from 1:5 to 1:3.

14. The motor according claim 11, wherein a clearance gap between the bearing and the shaft is in a range of 3 $\mu$m to 7 $\mu$m.

15. The motor according to claim 11, wherein said housing is molded with a synthetic resin to a base to which the stator is connected.

16. The motor according to claim 11, wherein a sectional view of said plastic plate is an anti-trapezoid and said plastic plate is inclined to the rotating shaft.

17. The motor according to claim 11, wherein a tapered insertion opening is provided on said housing, and a contacting section of said plastic plate is formed as an inverse trapezoid to be received by said insertion opening.

18. A brushless DC motor having a rotor with a field magnet and a rotatively supported shaft, and a stator with stator magnetic poles having salient poles in opposition to the rotor field magnet, comprising:

a rotating portion which rotates with said rotor;

a bearing, connected to a housing, said bearing including a surface which contacts the shaft to rotatively support the rotor;

said stator poles being located on a stator yoke in opposition to said rotor magnet, said stator poles including a plurality of salient poles having drive coils in a circumferential direction, and a plurality of auxiliary poles;

a spiral groove formed on the bearing extending continuously in an axial direction of the bearing with a constant angle of inclination;

lubricating oil filling said groove;

first pole pieces formed from soft magnetic material, having a shape, viewed from a side thereof, like a square with a side removed, and inserted on one side of the salient poles;

second pole pieces formed from soft magnetic material, having a shape, viewed from a side thereof, like a square with a side removed, and inserted on an opposite side of said plurality of auxiliary poles;

said first and second pole pieces collecting magnetic flux;

a plastic plate on an end of said rotating shaft to receive a force in a thrust direction of said rotating shaft, wherein an angle between the spiral groove and the axial direction of the shaft is in a range from 60° to 87°.

19. The motor according to claim 18, wherein a contact area ratio between the groove and the shaft is in a range from 1:5 to 1:3.

20. The motor according claim 19, wherein a clearance gap between the bearing and the shaft is in range of 3 $\mu$m to 7 $\mu$m.

21. The motor according to claim 20, wherein said housing is molded with a synthetic resin to a base to which the stator is connected.

* * * * *